United States Patent
Sumi

(10) Patent No.: US 11,245,294 B2
(45) Date of Patent: Feb. 8, 2022

(54) STATOR AND MOTOR

(71) Applicant: NIDEC CORPORATION, Kyoto (JP)

(72) Inventor: Shigeharu Sumi, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 75 days.

(21) Appl. No.: 16/626,885

(22) PCT Filed: Jun. 12, 2018

(86) PCT No.: PCT/JP2018/022314
§ 371 (c)(1),
(2) Date: Dec. 27, 2019

(87) PCT Pub. No.: WO2019/021656
PCT Pub. Date: Jan. 31, 2019

(65) Prior Publication Data
US 2020/0144877 A1 May 7, 2020

(30) Foreign Application Priority Data

Jul. 25, 2017 (JP) .............................. JP2017-143623

(51) Int. Cl.
*H02K 1/18* (2006.01)
(52) U.S. Cl.
CPC ..................... *H02K 1/18* (2013.01)
(58) Field of Classification Search
CPC ................................ H02K 1/18; H02K 15/02
USPC ...... 310/216.079, 216.86, 216.088, 216.091, 310/216.092
See application file for complete search history.

(56) References Cited

U.S. PATENT DOCUMENTS 3,909,241 A * 9/1975 Cheney .................... C23C 4/08
75/255
4,477,744 A 10/1984 Gerber
(Continued)

FOREIGN PATENT DOCUMENTS

JP S55-125045 U 2/1979
JP 60035929 A * 2/1985 ............. H02K 1/187
(Continued)

OTHER PUBLICATIONS

Machine Translation JP2005323429 (Year: 2005).*

*Primary Examiner* — Jose A Gonzalez Quinones
(74) *Attorney, Agent, or Firm* — Hauptman Ham, LLP

(57) ABSTRACT

A stator configured to rotate of a rotor about a central axis includes a first member having a plurality of first concavity portions located in a circumferential direction at a preset interval, each of first concavity portions having a pair of first inner side face and second inner side face whose a circumferential-directional distance therebetween with respect to the central axis becomes narrow from one radial-directional side towards the other radial-directional side with respect to the central axis; and a plurality of second members, each of which having a first protrusion extending along the first inner side face, a second protrusion extending along the second inner side face, and a teeth portion protruding from the first protrusion and the second protrusion to the other radial-direction side, wherein the plurality of second members are formed to corresponding to the plurality of concavity portions, respectively.

20 Claims, 19 Drawing Sheets

(56) References Cited

U.S. PATENT DOCUMENTS

| | | | |
|---|---|---|---|
| 4,492,889 A * | 1/1985 | Fukushi | H02K 5/128 29/596 |
| 6,107,718 A * | 8/2000 | Schustek | H02K 3/18 310/216.086 |
| 6,781,278 B2 | 8/2004 | Liao | |
| 9,000,650 B2 * | 4/2015 | Andersen | H02K 1/148 310/216.008 |
| 2004/0124734 A1 | 7/2004 | Liao | |
| 2009/0026875 A1 | 1/2009 | Mongeau et al. | |

FOREIGN PATENT DOCUMENTS

| | | | |
|---|---|---|---|
| JP | S60-35929 A | | 2/1985 |
| JP | 2004-229472 A | | 8/2004 |
| JP | 2005-323429 A | | 11/2005 |
| JP | 2005323429 A | * | 11/2005 |
| JP | 2007-259562 A | | 10/2007 |
| JP | 2014-204475 A | | 10/2014 |

* cited by examiner

STATOR AND MOTOR

CROSS REFERENCE TO RELATED APPLICATIONS

This is the U.S. national stage of application No. PCT/JP2018/022314 filed on Jun. 12, 2018 and priority under 35 U.S.C. § 119(a) and 35 U.S.C. § 365(b) is claimed from Japanese Application No. 2017-143623 filed on Jul. 25, 2017.

FIELD OF THE INVENTION

The present disclosure relates to a stator and a motor.

BACKGROUND

A stator of a motor is generally composed of a stator core and a plurality of coils installed on a stator core. By increasing the space factor of the coil constituting the stator, it is possible to enhance the output without increasing the size of the motor.

The coil of the stator is comprised of, for example, a winding wire wound around a teeth formed on the stator. Therefore, from a viewpoint of making winding work efficient, the stator of the motor having many slots may be comprised from several members.

When this type of stator is used, for example, it is possible to remove the members constituting the teeth and perform winding work. As a result, the winding work can be made more efficient. In addition, since the degree of freedom of the winding method is increased, the space factor of coil may be improved.

When the motor is rotated, various forces such as an electromagnetic force, thermal stress or the like act on the stator. For that reason, it is necessary to keep the rigidity of the stator high. In particular, when the stator is comprised a plurality of members, there is a need to firmly combine each member.

SUMMARY

The present disclosure has been made in view of the above circumstances, and an object of the present disclosure to firmly combine members constituting a stator.

In order to achieve the above object, a stator of the present disclosure is a stator configured to rotate a rotor about a central axis, this stator includes a first member having a plurality of first concavity portions located in a circumferential direction at a preset interval, each of first concavity portions having a pair of first inner side face and second inner side face whose a circumferential-directional distance therebetween with respect to the central axis becomes narrow from one radial-directional side towards the other radial-directional side with respect to the central axis; and a plurality of second members, each of which having a first protrusion extending along the first inner side face, a second protrusion extending along the second inner side face, and a teeth portion protruding from the first protrusion and the second protrusion to the other radial-direction side, wherein the plurality of second members are formed to corresponding to the plurality of concavity portions, respectively In addition, a motor according to the present disclosure includes a shaft supported rotatably about a central axis, a rotor secured to the shaft, and the above-mentioned stator configured to rotate the rotor about the central axis by an electromagnetic action with the rotor.

The above and other elements, features, steps, characteristics and advantages of the present disclosure will become more apparent from the following detailed description of the preferred embodiments with reference to the attached drawings.

DETAILED DESCRIPTION

Hereinafter, a first preferred embodiment is described with reference to the drawings. In the description, an X-Y-Z coordinate system consisting of an X axis, a Y axis, and a Z axis that are orthogonal to each other is used as appropriate. In addition, in the following description, a direction (Z-axial direction) in which a central axis J extends is referred to as a vertical direction. A positive side (+Z side) in the Z-axial direction is referred to as "an upper side", and a negative side (−Z side) in the Z-axial direction is referred to as "a lower side". In addition, the vertical direction, the upper side, and the lower side are names used for explanation only, and do not limit an actual positional relationship and direction. Furthermore, unless otherwise specified, a direction parallel to the central axis J (Z-axial direction) is simply referred to as an "axial direction", a radial direction centered on the central axis J is simply referred to as a "radial direction", and a circumferential direction centered on the central axis J, that is, an axial circumference of the central axis J is simply referred to as a "circumferential direction".

Figure 1:
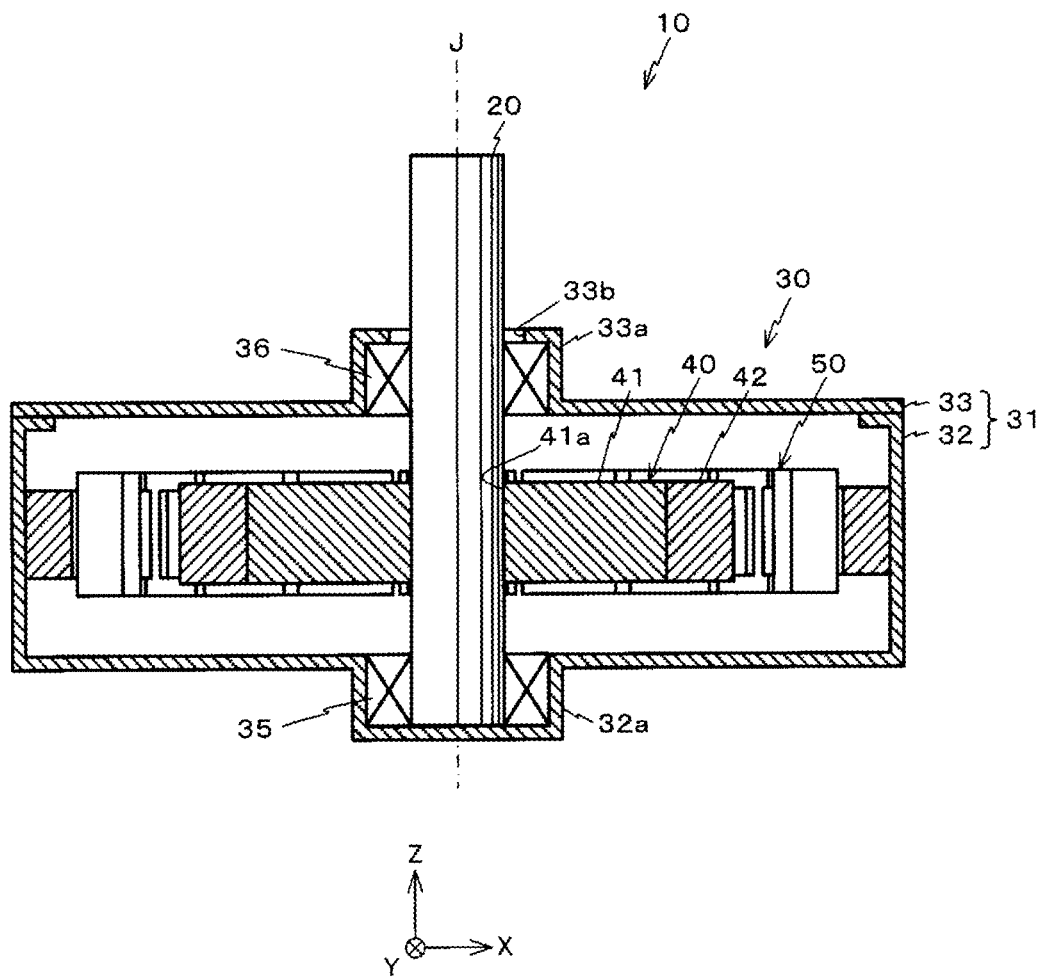
FIG. 1 is a diagram showing a X-Z cross-section of a motor.

FIG. 1 is a diagram showing a X-Z cross section of a motor 10. The motor 10 is provided with a shaft 20 and a motor main body 30. The motor body 30 is provided with a casing 31, and a rotor 40 and a stator 50 accommodated in the casing 31.

The casing 31 is comprised of a case 32 and a cap 33. The case 32 has a cylindrical shape with an opened upper portion, and a protrusion 32*a* protruding downward is formed on a central portion of a lower face thereof. A lower bearing 35 is disposed inside the protrusion 32*a* to rotatably support the shaft 20 about the central shaft J. The case 32 is formed, for example, of metal such as iron, a stainless steel plate or the like. The case 32 may be formed, for example, by pressing a metal plate.

The cap 33 is a circular-plate shaped member. A protrusion 33*a* protruding upward is formed on a central portion of the cap 33. A circular opening 33*b* having a diameter larger than an outer diameter of the shaft 20 is formed in an upper face of the protrusion 33*a*. An upper bearing 36 is disposed inside the protrusion 33*a* to rotatably support the shaft 20 about the central shaft J. Like the case 32, the cap 33 is also made of metal such as iron, a stainless steel plate or the like. Furthermore, the cap 33 may also be formed by pressing a metal plate.

The case 32 and the cap 33 are integrated by disposing the cap 33 above the case 32 and fixing the cap 33 to the case 32 with, for example, a bolt, a screw, a caulking or the like. Due to the above configuration, the casing 31 which accommodates the rotor 40 and the stator 50 is formed.

The shaft 20 is a cylindrical member whose longitudinal direction is a Z-axial direction. The shaft 20 is made of, for example, a metal such as stainless steel. In a state in which the shaft is inserted into the opening 33*b* formed in the cap 33, the shaft 20 is rotatably supported about an axis parallel to a Z-axis by the lower bearing 35 and the upper bearing 36.

The rotor 40 is fixed to the shaft 20. The rotor 40 is comprised of a base 41 fixed to the shaft 20 and a magnet 42 mounted on the base 41.

The base 41 is a circular plate-shaped member made of, for example, a metal such as iron. A circular opening 41*a* passing through in the Z-axial direction is formed in a central portion of the base 41.

The magnet 42 is an annular member made of a material containing, for example, neodymium. The magnet 42 is magnetized so that N poles and S poles are alternately arranged in a circumferential direction.

As shown in FIG. 1, in a state in which the shaft 20 is inserted into the opening 41*a*, the base 41 constituting the rotor 40 is fixed to the shaft 20. Due to this configuration, the rotor 40 and the shaft 20 are integrated.

Figure 2:
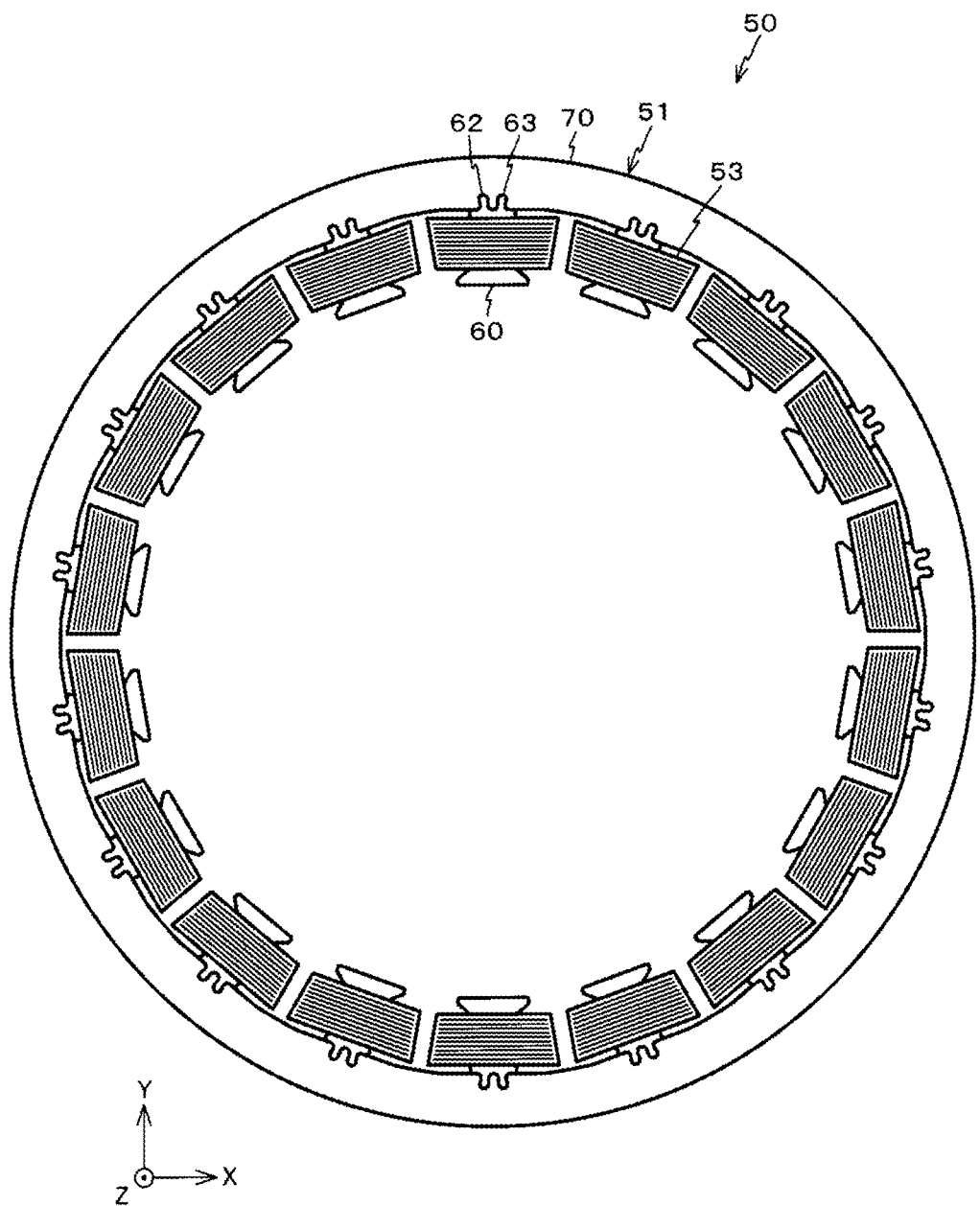
FIG. 2 is a plan view of a stator.
Figure 3:
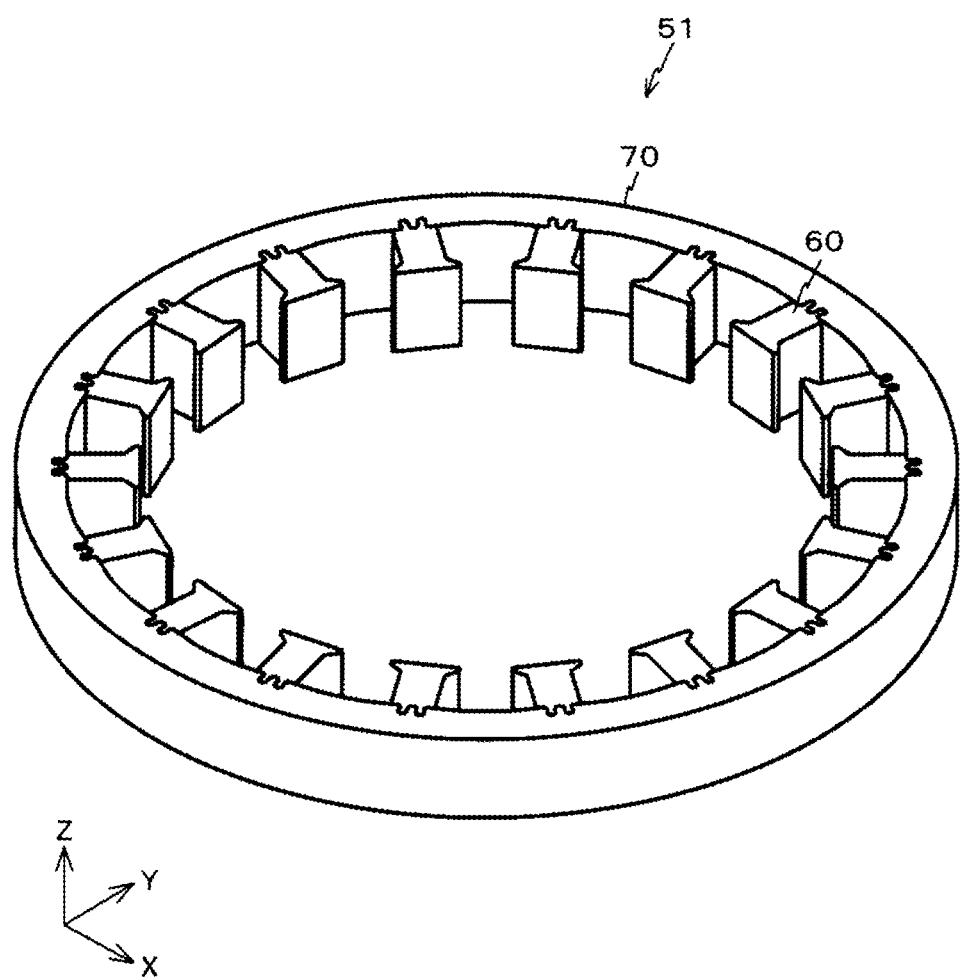
FIG. 3 is a perspective view of a stator core.
Figure 4:
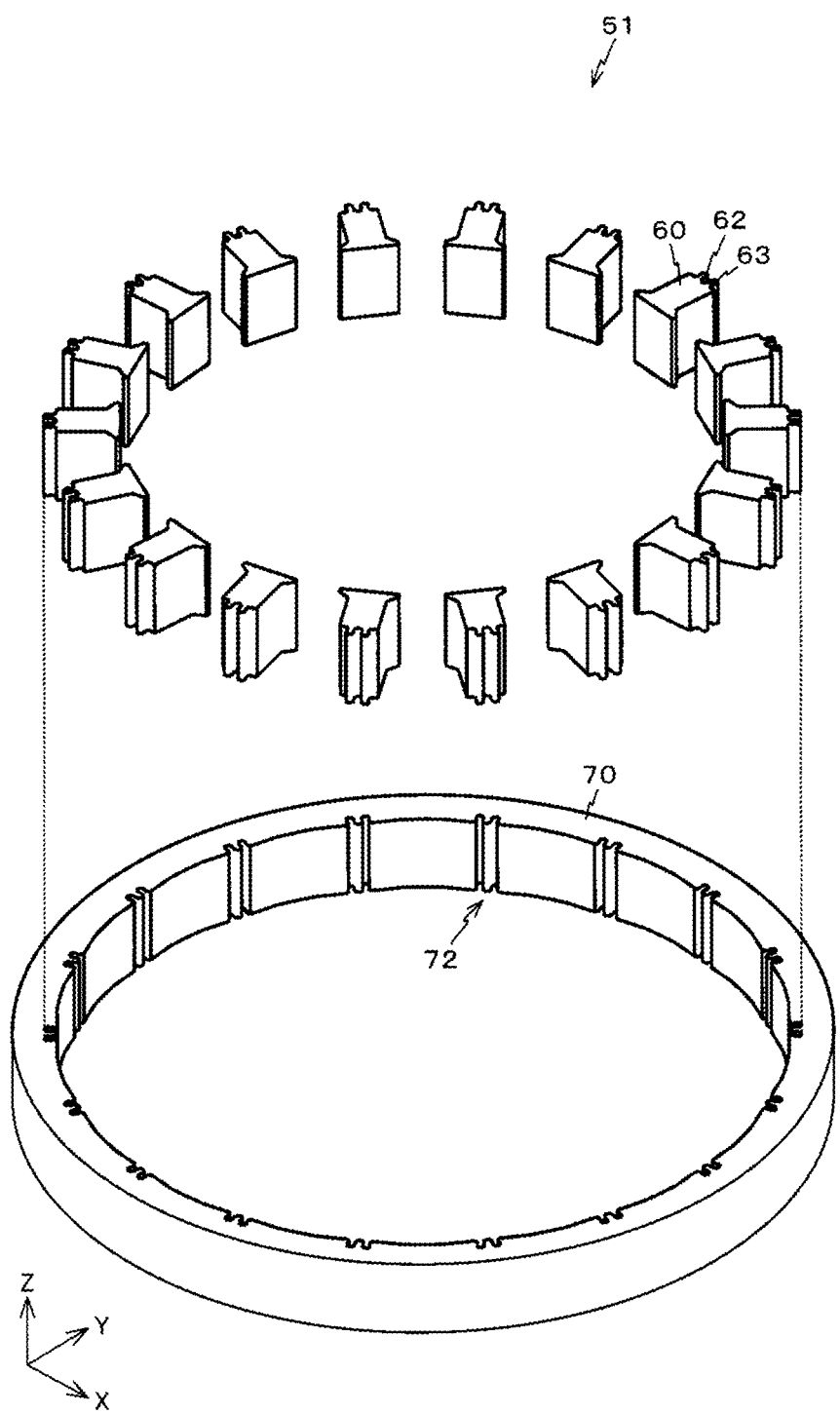
FIG. 4 is an exploded perspective view of the stator core.

FIG. 2 is a plan view of the stator 50. As shown in FIG. 2, the stator 50 is provided with a stator core 51 and eighteen (18) coils 53. FIG. 3 is a perspective view of the stator core 51. In addition, FIG. 4 is an exploded perspective view of the stator core 51. The stator core 51 is composed of a first member 70 and eighteen (18) second members 60 attached to the first member 70.

Figure 5:
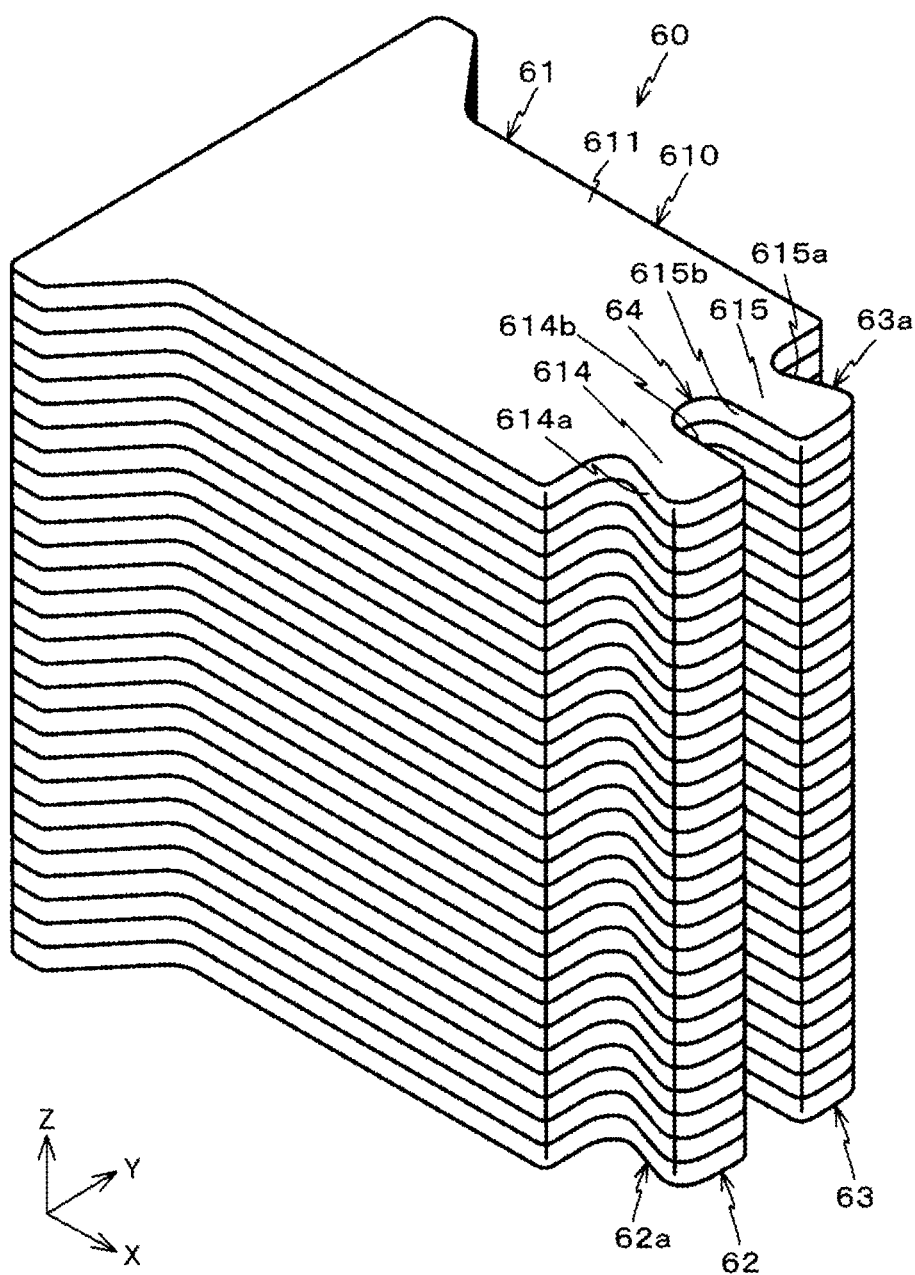
FIG. 5 is a perspective view of a second member.

FIG. 5 is a perspective view of the second member 60. As shown in FIG. 5, the second member 60 is composed of stacked plate-shaped plates 610. The plate 610 is a member that is produced by punching an electromagnetic steel plate, for example, a silicon steel plate or the like having a thickness of about 0.3 mm through a punching process.

Figure 6:
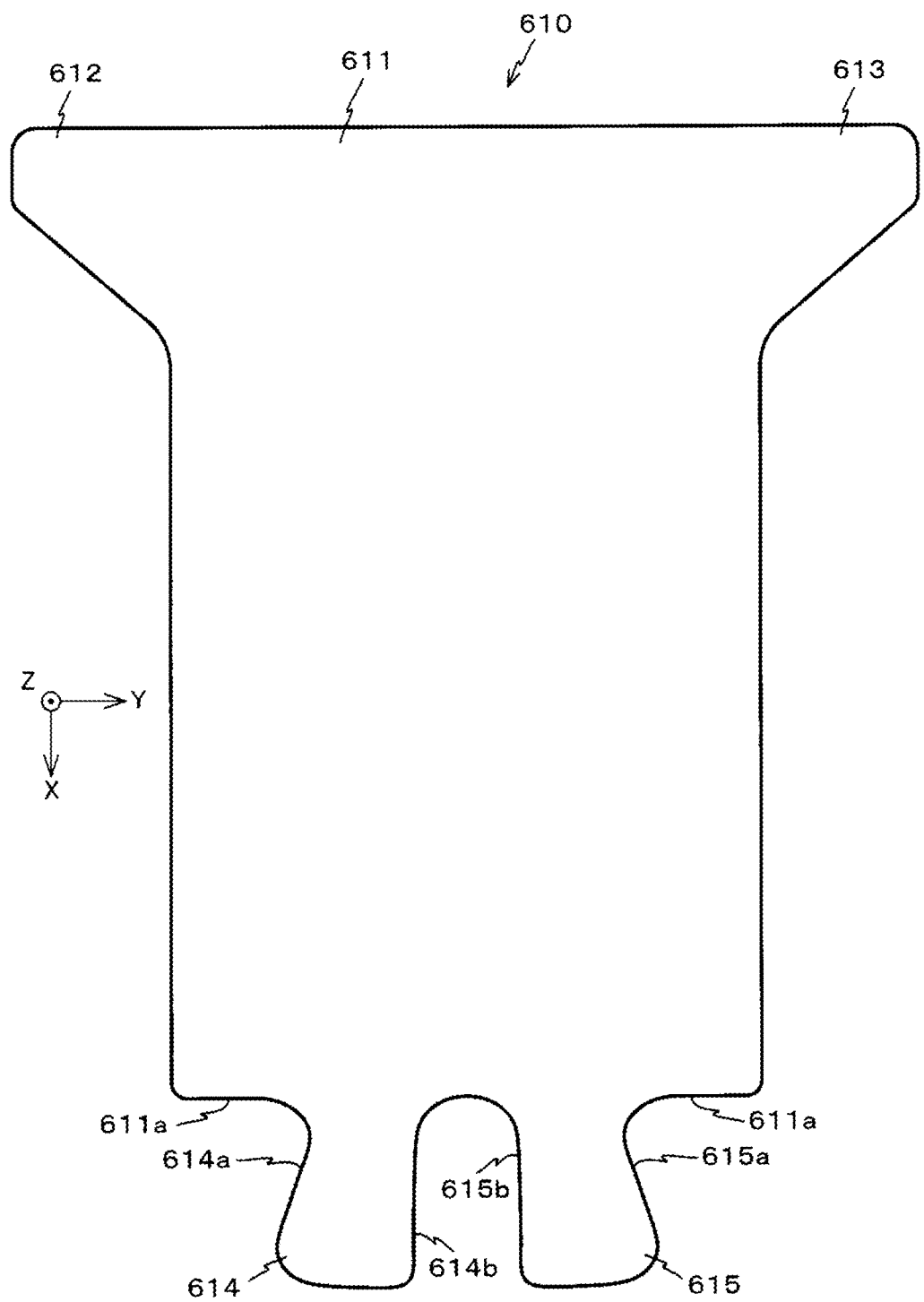
FIG. 6 is a plan view of a plate.

FIG. 6 is a plan view of the plate 610. The plate 610 has a rectangular main body 611 whose longitudinal direction is a X-axial direction, a pair of overhang portions 612, 613 protruding from an −X side end of the main body 611 in a Y-axial direction from, and a pair of overhang portions 614, 615 protruding from an +X side end of the main body 611 in a +X direction.

An end face 611*a* of the +X side of the plate 610 is formed to be parallel to a YZ plane. In addition, the overhang portions 614, 615 are opposed to each other with a gap in the Y-axial direction. A −Y side outer edge portion 614*a* of the overhang portion 614 and a +Y side outer edge portion 615*a* of the overhang portion 615 are formed so that a distance therebetween in the Y-axial direction widens from the −X side to the +X side. In addition, a +Y side outer edge portion 614*b* of the overhang portion 614 and a −Y side outer edge portion 615*b* of the overhang portion 615 are formed so that a distance therebetween in the Y-axial direction slightly widen from the −X side to the +X side.

As shown in FIG. 5, by stacking the plurality of plates 610 and bonding them together, the second member 60 is formed. The second member 60 has a first protrusion 62, a second protrusion 63, and a teeth portion 61. In the second member 60, the first protrusion 62 is formed by the overhang portions 614 of the plurality of plates 610, and the second protrusion 63 is formed by the overhang portions 615. The teeth portion 61 protrudes from the first protrusion 62 and the second protrusion 63 to the other radial-direction side. In addition, a contact face 62*a* of the −Y side of the first protrusion 62 is formed by the outer edge portions 614*a* of the overhang portions 614 of the plurality of plates 610. Similarly, a contact face 63*a* of the +Y side of the second protrusion 63 is formed by the outer edge portions 615*a* of the overhang portions 615 of the plurality of plates 610. Furthermore, in the second member 60, a dent portion 64 in a concaved shape in a −X direction is formed by the outer edge portions 614*b* of the overhanging portions 614 and the outer edge portions 615*b* of the overhanging portions 615 of the plurality of plates 610. That is, the second member 60 has the dent portion 64, which is concaved towards the other radial-directional side, between the first protrusion 62 and the second protrusion 63. In addition, the teeth portion 61 is formed by the main bodies 611 of the plurality of plates 610.

Figure 7:
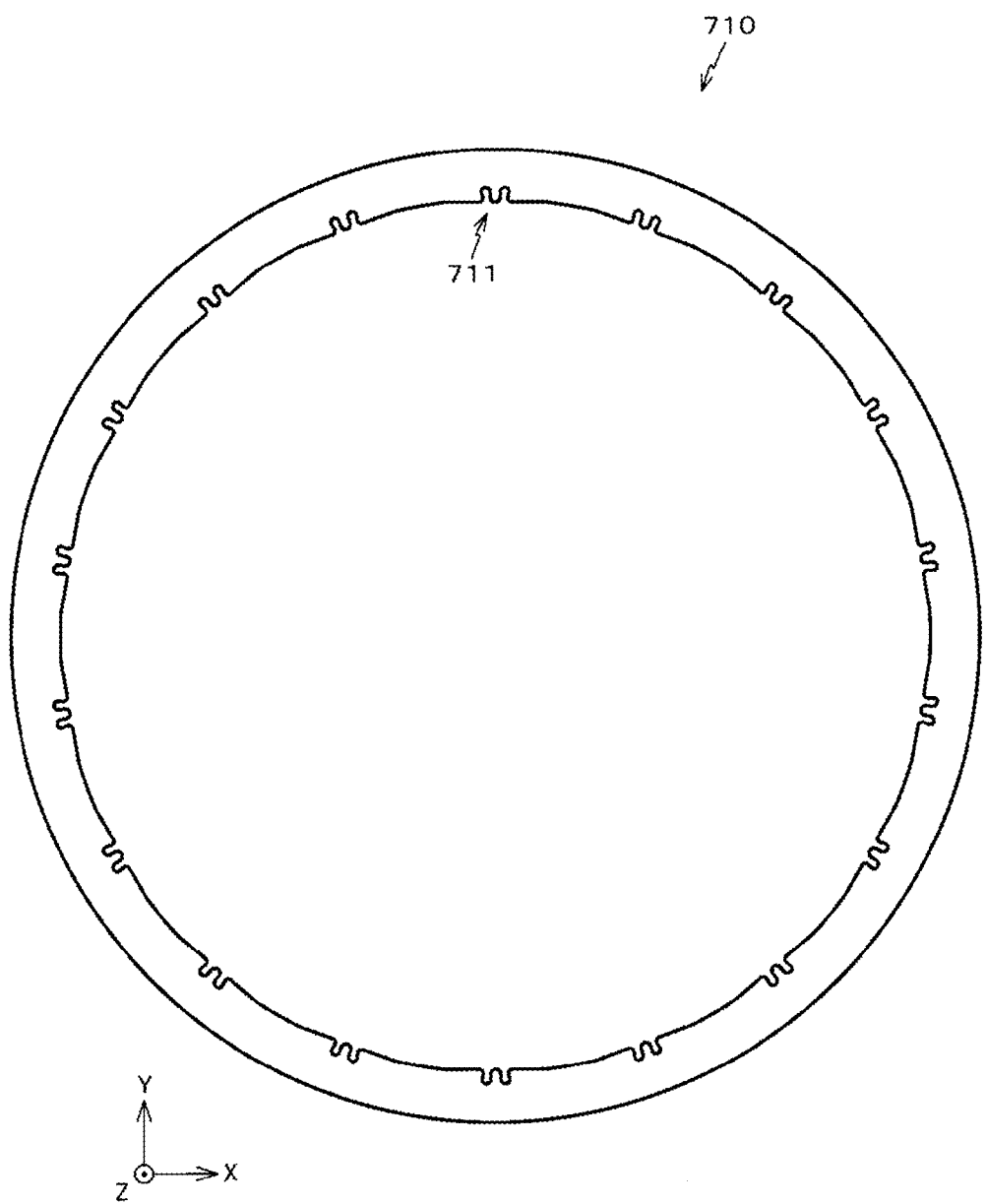
FIG. 7 is a plan view of an annular plate.
Figure 8:
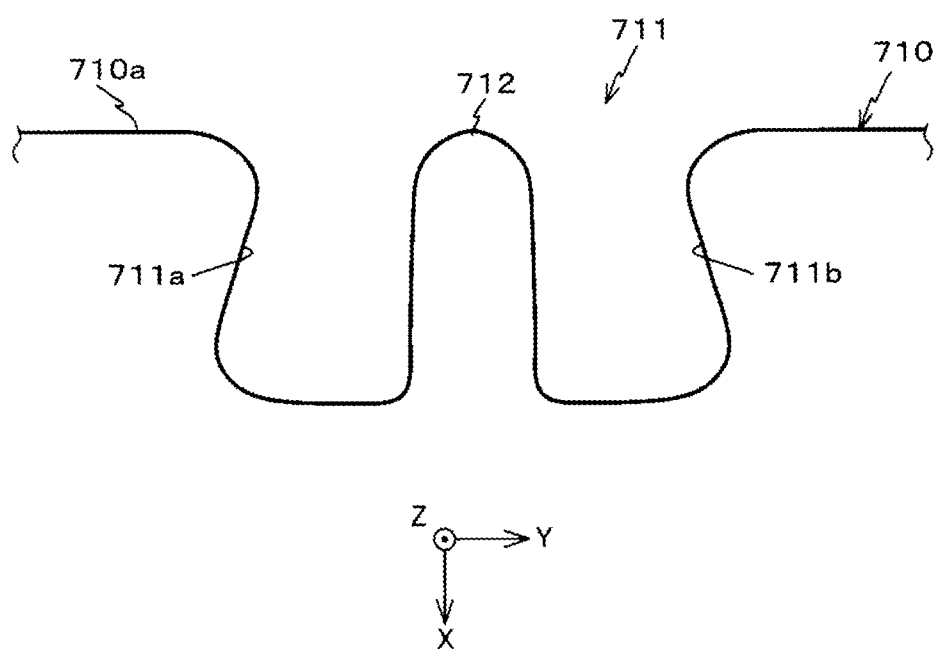
FIG. 8 is an enlarged view showing a notch portion formed on the annular plate.

As shown in FIG. 4, the first member 70 is an annular member. Like the second member 60, the first member 70 is also formed by stacking a plurality of annular plates 710 shown in FIG. 7. As shown in FIG. 7, eighteen (18) notch portions 711 are formed on a radial-directional inner side of the annular plate 710 at regular intervals. FIG. 8 is an enlarged view of the notch portion 711 formed in the annular plate 710. As shown in FIG. 8, the notch portion 711 includes an outer edge 711*a* on the −Y side and an outer edge 711*b* on the +Y side of the annular plate 710. The outer edge 711*a* and the outer edge 711*b* are formed so that a distance therebetween in the Y-axial direction in FIG. 8 becomes narrow from the +X side toward the −X side. Furthermore, the annular plate 710 has an overhang portion 712 formed thereon and protruding from a back side of the notch portion 711 toward a center of the annular plate 710.

Figure 9:
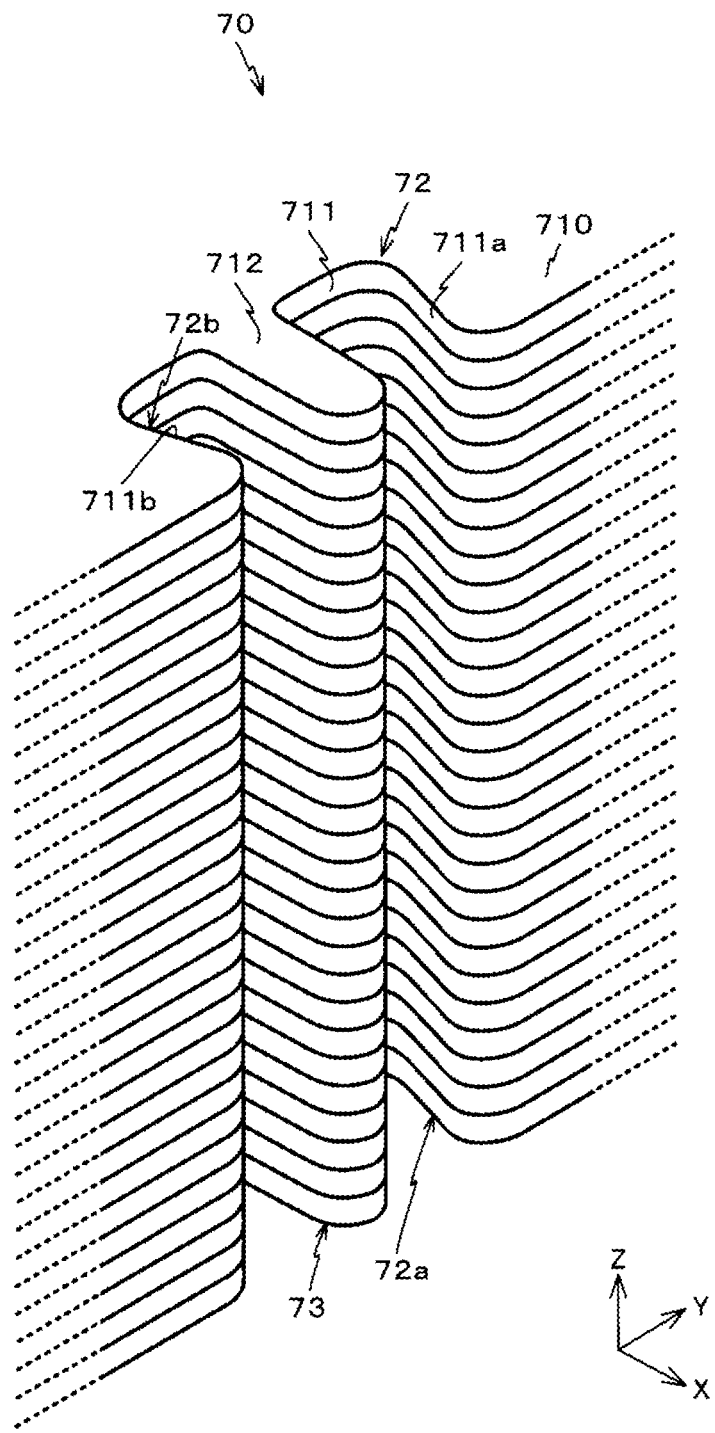
FIG. 9 is an enlarged view showing a portion of a first member.

By stacking the plurality of annular plates 710 configured as described above and bonding them together, the first member 70 shown in FIG. 4 is formed. FIG. 9 is an enlarged view of a portion of the first member 70. As shown in FIG. 9, in the first member 70, a plurality of first concavity portions 72 are formed by the notch portions 711 of the plurality of annular plates 710. The first member 70 has the plurality of first concavity portions 72. In addition, a first inner side face 72*a* is formed on an inner side of the first concavity portion 72 by the outer edges 711*a* of the plurality of annular plates 710. Similarly, a second inner side face 72*b* is formed an inner side of the first concavity portion 72 by the outer edge 711b of the annular plate 710. A distance in the Y-axial direction between the pair of first inner side face 72a and second inner side face 72b becomes narrow from the −X side toward the +X side. In addition, a convexity portion 73 is formed by the overhang portions 712 of the plurality of annular plates 710.

As can be seen with reference to FIG. 4, the first member 70 and the second member 60 configured as described above are integrated by lightly press-fitting the first protrusion 62 and the second protrusion 63 of the second member 60 into the first concavity portion 72 of the first member 70 from one side in the Z-axial direction.

Figure 10:
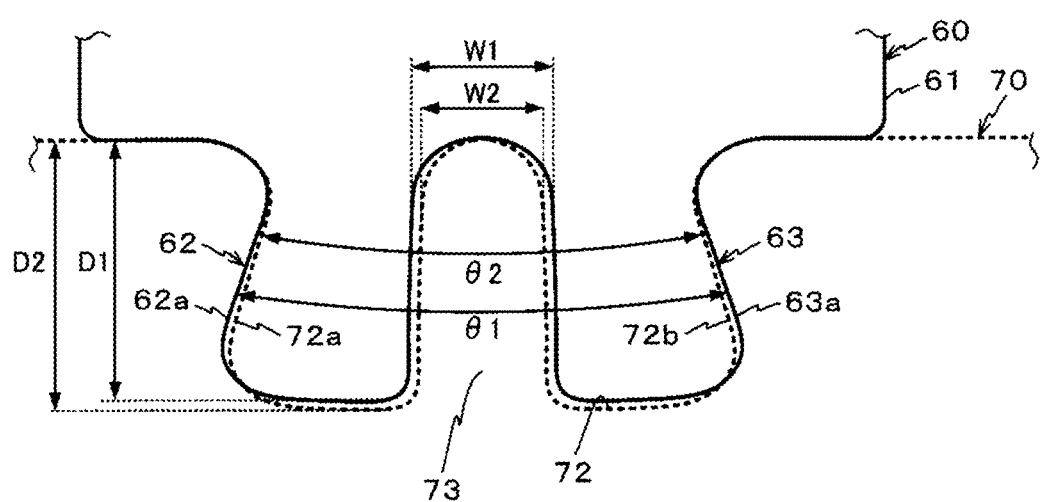
FIG. 10 is a diagram for comparing shapes of a first protrusion and a second protrusion of the second member with a shape of a depression of the first member.

FIG. 10 is a diagram for comparing the shapes of the first protrusion 62 and the second protrusion 63 of the second member 60 with the shape of the first concavity portion 72 of the first member 70. In FIG. 10, the outer edge of the second member 60 is indicated by a solid line, and the outer edge of the first member 70 is indicated by a broken line.

As shown in FIG. 10, when the second member 60 is not attached to the first member 70, an angle θ1 formed by the contact face 62a of the first protrusion 62 of the second member 60 and the contact face 63a of the second protrusion 63 is greater than an angle θ2 formed by the first inner side face 72a and the second inner side face 72b of the first concavity portion 72 formed in the first member 70. Furthermore, a width W2 of the convexity portion 73 is slightly smaller than a distance W1 between the first protrusion 62 and the second protrusion 63.

Figure 11:
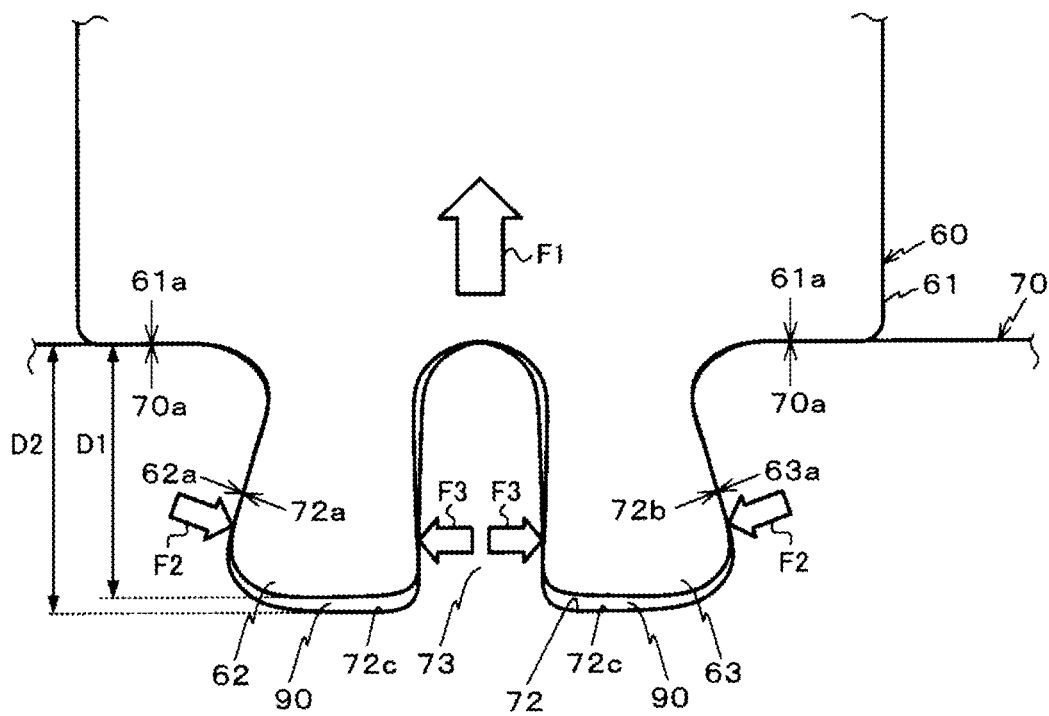
FIG. 11 is a diagram showing connecting portions of the first member 70 and the second member 60.

FIG. 11 is a diagram showing connecting portions between the first member 70 and the second member 60. As shown in FIG. 11, the first protrusion 62 and the second protrusion 63 that are lightly press-fitted into the first concavity portion 72 of the first member 70 are deformed to be approached to each other. Due to the above, when the second member 60 is attached to the first member 70, these members are in a state in which the contact face 62a of the first protrusion 62 and the contact face 63a of the second protrusion 63 formed on the second member 60 are pressed against the first inner side face 72a and the second side face 72b, respectively, of the first concavity portion 72 formed in the first member 70, respectively. In addition, the second member 60 attached to the first member 70 is in a state in which the teeth portion 61 protrudes towards a radial-directional inner side of the first member 70.

As shown in FIG. 11, a radial-directional length D1 of the first protrusion 62 and the second protrusion 63 is shorter than a radial-directional length (depth) D2 of the first concavity portion 72. Due to the above, a clearance 90 is formed between a front end of each of the first protrusion 62 and the second protrusion 63 and an inner wall face 72c of the first concavity portion 72 positioned between the first inner side face 72a and the second inner side face 72b. That is, the first concavity portion 72 includes the inner wall face 72c positioned between the first inner side face 72a and the second inner side face 72b, and there is the clearance between a front end of one radial-directional side of each of the first protrusion 62 and the second protrusion 63, and the inner wall face 72c. Therefore, even if manufacturing error occurs in the second member 60 or the first member 70, an end face 61a of the teeth portion 61 and an inner circumferential face 70a of the first member 70 are in close contact with each other. Due to the above, the second member 60 is accurately positioned with respect to the first member 70.

The second member 60 attached to the first member 70 is finally bonded to the first member 70 with an adhesive. Due to the above, the stator core 51 in which the second member 60 is disposed on a radial-directional outer side of the first member 70 is assembled.

As shown in FIG. 2, actually, before attaching the second member to the first member 70, a copper wire or the like is wound around the second member 60 to form the coil 53. Also, the stator 50 is completed by attaching the second member 60 in which the coil 53 is formed to the first member 70.

As described above, in the present preferred embodiment, for example, as shown in FIG. 4, the second member 60 is provided with the first protrusion 62 and the second protrusion 63 that protrude from a radial-directional center of the motor 10 towards a radial-directional outer side. Moreover, the first concavity portions 72 are formed in the radial-directional inner side of the first member 70 at regular intervals. As shown in FIG. 11, this first concavity portion 72 includes the first inner side face 72a and the second inner side face 72b whose a circumferential-directional distance therebetween becomes narrow from a radial-directional outer side towards a radial-directional inner side. In addition, the second member 60 is attached to the first member 70 by lightly press-fitting the first protrusion 62 and the second protrusion 63 into the first concavity portion 72 of the first member 70. When the second member 60 is attached to the first member 70, as shown in FIG. 11, the first protrusion 62 and the second protrusion 63 which are lightly press-fitted into the first concavity portion 72 of the first member 70 are deformed to be approached each other. That is, when the second member 60 is attached to the first member 70, These members are in a state in which the contact faces 62a, 63a of the first protrusion 62 and the second protrusion 63 formed on the second member 60 are pressed against the first inner side face 72a and the second inner face 72b, respectively, of the first concavity portion 72 of the first member 70. Therefore, it is possible to firmly fix the second member 60 to the first member 70.

In the present preferred embodiment, as shown in FIG. 11, the convexity portion 73 positioned between the first protrusion 62 and the second protrusion 63 of the second member 60 is formed in the first concavity portion 72 of the first member 70. For this reason, even if a force such as an electromagnetic force or thermal stress acts on the second member 60, deformation of the first protrusion 62 and the second protrusion 63 in a direction in which two protrusions are approached to each other is suppressed. Due to the above, a state in which the contact face 62a of the first protrusion 62 and the contact faced 63a of the second protrusion 63 are in contact with the first inner side face 72a and the second inner side face 72b of the first concavity portion 72 is maintained, and a separation of the second member 60 from the first member 70 is suppressed.

For example, when a radial-directional force F1 acts on the second member 60, a force F2 by which the first protrusion 62 and the second protrusion 63 are approached to each other (closed) acts on the contact face 62a of the first protrusion 62 and the contact faced 63a of the second protrusion 63, wherein the first protrusion 62 and the second protrusion 63 are the protrusions of the second member 60. However, a force F3 opposite to the force F2 is generated between the convexity portion 73 of the first member 70 and each of the first protrusion 62 and the second protrusion 63. Accordingly, deformation by which the first protrusion 62 and the second protrusion 63 are closed is suppressed, and as a result, a separation of the second member 60 from the first member 70 is suppressed.

In the present preferred embodiment, the stator core 51 is comprised of the first member 70 and the second member 60. For this reason, the second member 60 may be attached to the first member 70 after the coil 53 is formed on the second member 60. Therefore, there is no need to worry about the size of a nozzle or a slot opening for winding a copper wire, and it is possible to enhance a winding space factor of the coil 53.

In the present preferred embodiment, the stator core 51 is composed of the first member 70 and the second member 60. For this reason, the first member 70 and the second member 60 may be formed of different materials. Therefore, by forming the second member 60 through which a large amount of magnetic flux passes with a material having a high saturation magnetic flux density and by forming the other portion with a general-purpose material, it is possible to maintain performance of the stator 50, while to miniaturize the device and reduce a cost.

Figure 12:
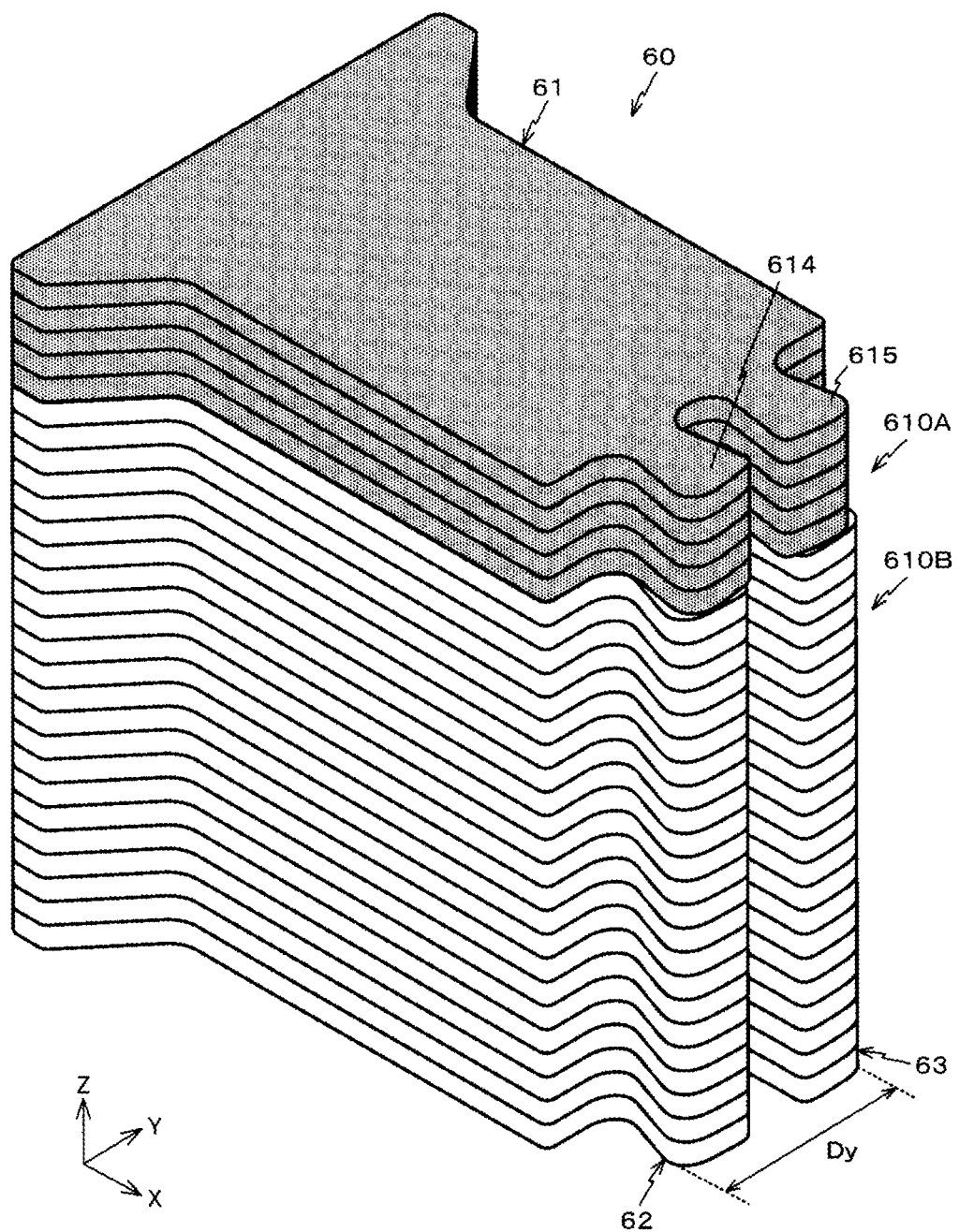
FIG. 12 is a diagram for describing a method of machining the second member.

In this preferred embodiment, as can be seen with reference to FIG. 4, the first protrusion 62 and the second protrusion 63 of the second member 60 are lightly press-fitted into the first concavity portion 72 of the first member 70 from one side in the Z-axial direction, and so the second member 60 is attached to the first member 70. When the second member 60 is attached to the first member 70, as shown in FIG. 12, among the plates 610 constituting the second member 60, there may be several plates 610A disposed at the end of the second member 60 and several plates 610B disposed in the middle of the second member 60. In this case, a distance Dy from the −Y side outer edge of the overhang portion 614 formed on the plate 610B to the +Y side outer edge of the overhang portion 615 is greater than a Y-axial-directional distance Dy from the −Y side outer edge of the overhang portion 614 formed on the plate 610A to the +Y side outer edge of the overhang portion 615. According to this configuration, since the overhanging portions 614 and the overhanging portions 615 of the plates 610A are positioned with respect to the first concavity portion 72 of the first member 70, it is possible to easily press-fit the first protrusion 62 and the second protrusion 63 into the first concavity portion 72.

Figure 13:
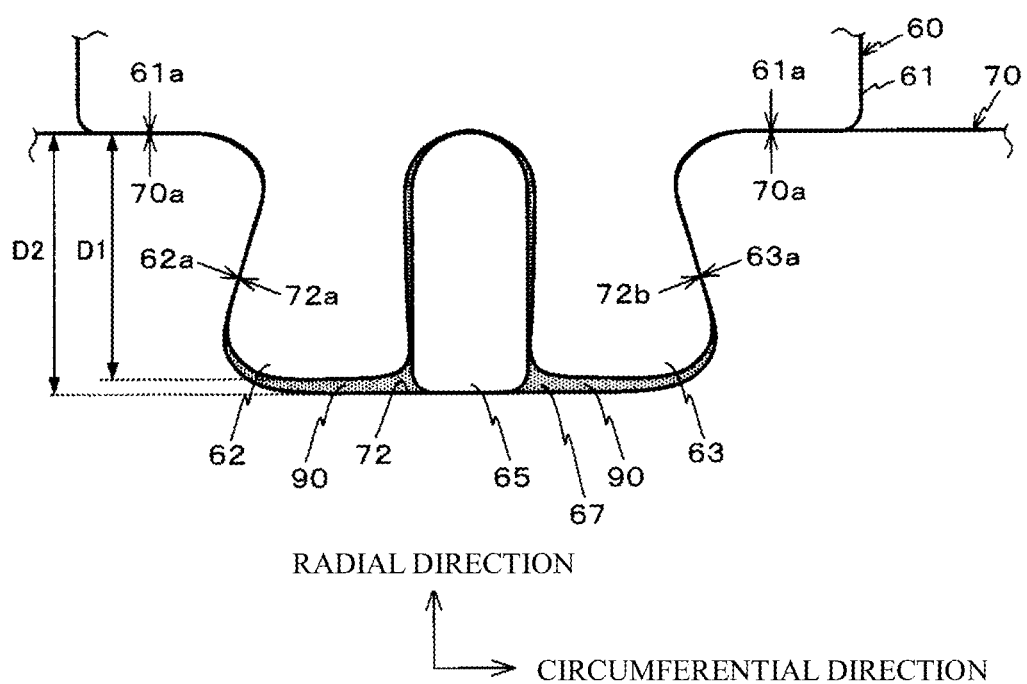
FIG. 13 is a diagram showing a shim member inserted into the second member.

Although the first preferred embodiment of the present disclosure has been described in the above description, the present disclosure is not limited to the above preferred embodiment. For example, in the above-described preferred embodiment, as shown in FIG. 11, the case in which the convexity portion 73 positioned between the first protrusion 62 and the second protrusion 63 of the second member 60 is formed on the first member 70 has been described. The present disclosure is not limited to the above configuration, and the convexity portion 73 may not be formed on the first member 70. In that case, as shown in FIG. 13 as an example, a shim member 65 is inserted between the first protrusion 62 and the second protrusion 63 of the second member 60. A circumferential-directional dimension of the shim member 65 is equal to the width W2 of the convexity portion shown in FIG. 10.

Figure 14:
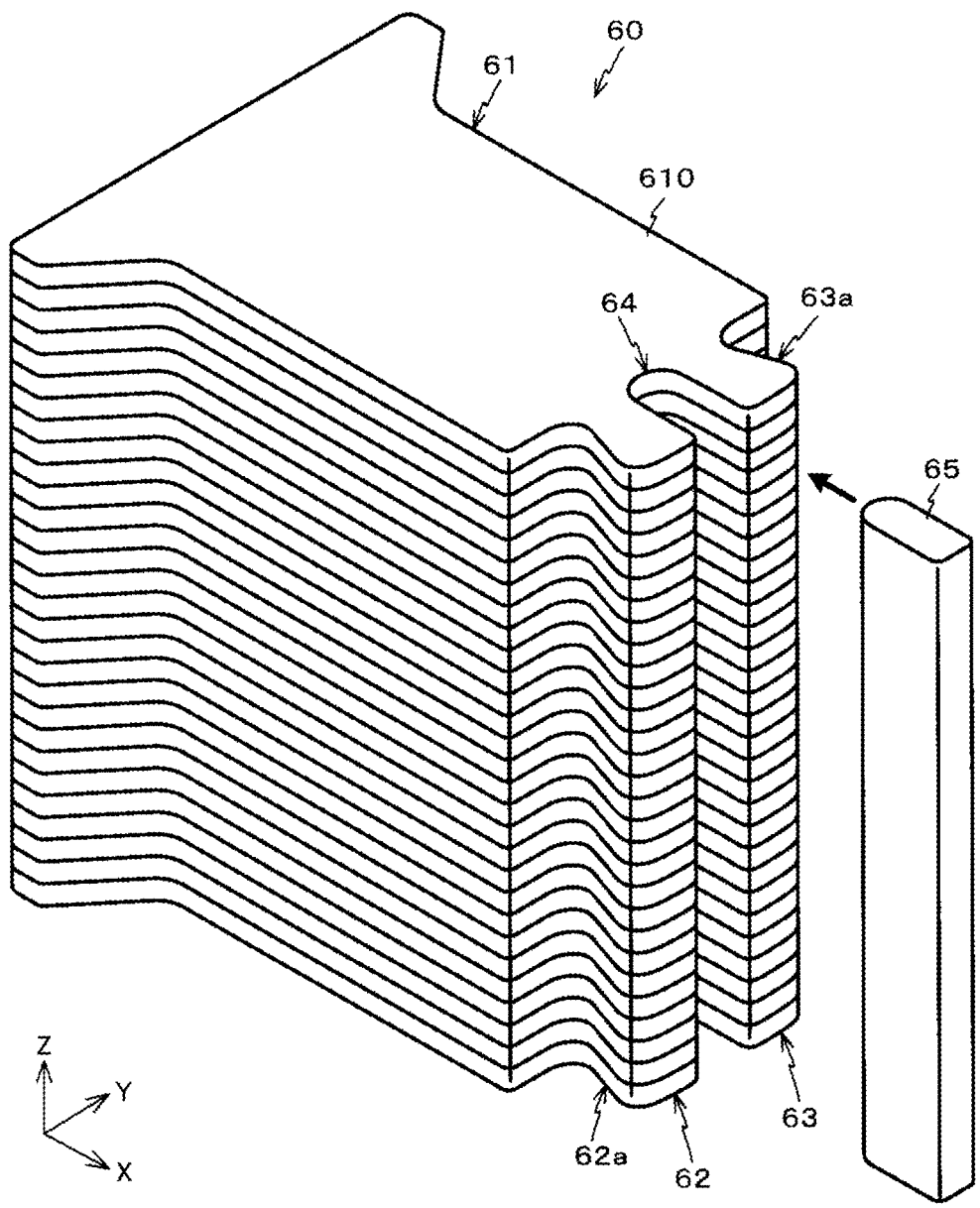
FIG. 14 is a perspective view of the shim member.

FIG. 14 is a perspective view of the shim member 65. The shim member 65 is a member whose longitudinal direction is a stacking direction of the plates 610 constituting the second member 60. The shim member 65 is made of a metal, for example, stainless steel (SUS400) or the like. The shim member 65 is formed such that a −X side thereof has a shape equal to the shape of the dent portion 64 between the first protrusion 62 and the second protrusion 63 formed on the second member 60. As indicated by an arrow in FIG. 14, the shim member 65 is inserted between the first protrusion 62 and the second protrusion 63 formed on the second member 60. At this time, for example, in a state in which the shim member 65 is inserted between the first protrusion 62 and the second protrusion 63, by deforming the overhang portions 614, 615 of the plate 610 disposed at an end of the second member 60 as shown in FIG. 12, it is possible to temporarily fix the shim member 65 to the second member 60.

As can be seen with reference to FIG. 4, the second member 60 into which the shim member 65 is inserted is attached to the first member 70 by lightly press-fitting the first protrusion 62 and the second protrusion 63 of the second member 60 into the first concavity portion 72 of the first member 70 from one side in the Z-axial direction. As shown in FIG. 13, the shim member 65 is bonded to the second member 60 and the first member 70 by a filler such as an adhesive or the like received between the first protrusion 62 and the second protrusion 63 formed on the second member 60.

In addition, the shim member 65 may also be inserted between the first protrusion 62 and the second protrusion 63 of the second member 60 after attaching the second member 60 to the first member 70. In this case, by inserting the shim member 65 between the first protrusion 62 and the second protrusion 63 like a wedge, surfaces of the first protrusion 62 and the second protrusion 63 and the inner wall face of the first concavity portion 72 may be in close contact with each other without a gap. Due to the above, deformation of the first protrusion 62 and the second protrusion 63 caused by a force acting on the second member 60 can be suppressed.

As shown in FIG. 13, by inserting the shim member 65 between the first protrusion 62 and the second protrusion 63 of the second member 60, even if a force such as an electromagnetic force, a thermal stress or the like is applied to the second member 60, the deformation of the first protrusion 62 and the second protrusion 63 is suppressed. As a result, a separation of the second member 60 from the first member 70 is suppressed. Furthermore, when the shim member 65 is made of a magnetic material such as a metal, as compared with the case where nothing is disposed between the first protrusion 62 and the second protrusion 63 of the second member 60, it is possible to reduce magnetic resistance of the stator core 51. Due to the above, it is possible to enhance of the output of the motor.

Figure 15:
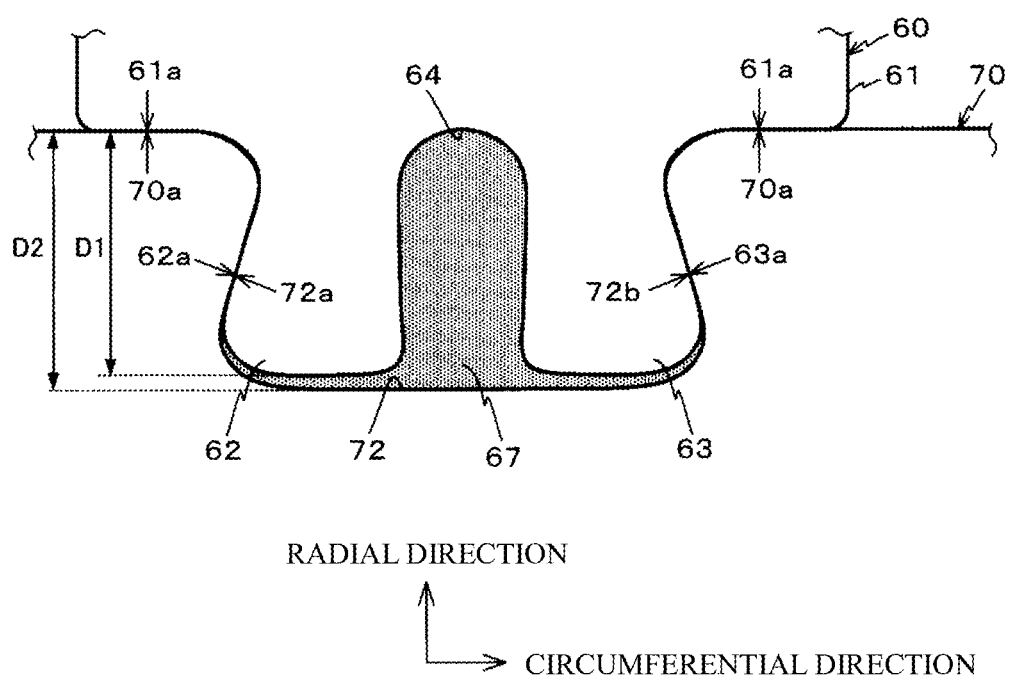
FIG. 15 is a diagram showing a filler with which a space between the first protrusion and the second protrusion of the second member is filled.

Furthermore, in the case where the convexity portion 73 is not formed on the first member 70, as shown in FIG. 15 as an example, the dent portion 64 between the first protrusion 62 and the second protrusion 63 of the second member 60 may be filled with a filler 67. By using the filler 67 having Young's modulus which becomes high after curing, it is possible to effectively suppress deformation of the first protrusion 62 and the second protrusion 63. As a result, it is possible to effectively suppress the second member 60 from being separated from the first member 70. As described above, it is possible to increase the rigidity of the stator core 51 by filling a space between the first protrusion 62 and the second protrusion 63 formed on the second member 60 with the filler 67 having high Young's modulus after curing.

It is preferable that the filler 67 has Young's modulus of 100 Mpa or more after curing. A space between the first protrusion 62 and the second protrusion 63 may be filled with the filler 67 after attaching the second member 60 to the first member 70. Alternatively, the second member 60 may be attached to the first member 70 after filling a space between the first protrusion 62 and the second protrusion 63 with the filler 67.

As the filler 67, a filler produced by mixing powdered inorganic materials, a filler produced by mixing resin and a powdered metal material, or the like is considered. As the filler containing the powdered inorganic material, for example, gypsum, cement or the like is considered. Moreover, as the filler containing the powdered metal material, for example, the filler produced by mixing epoxy resin and powdered iron is considered. Furthermore, as the filler, for example, low melting point metal such as zinc, indium, gallium, tin, bismuth, lead and the like, a low melting point alloy such as solder, wood metal, a rose's alloy, or the like may be used.

Figure 16:
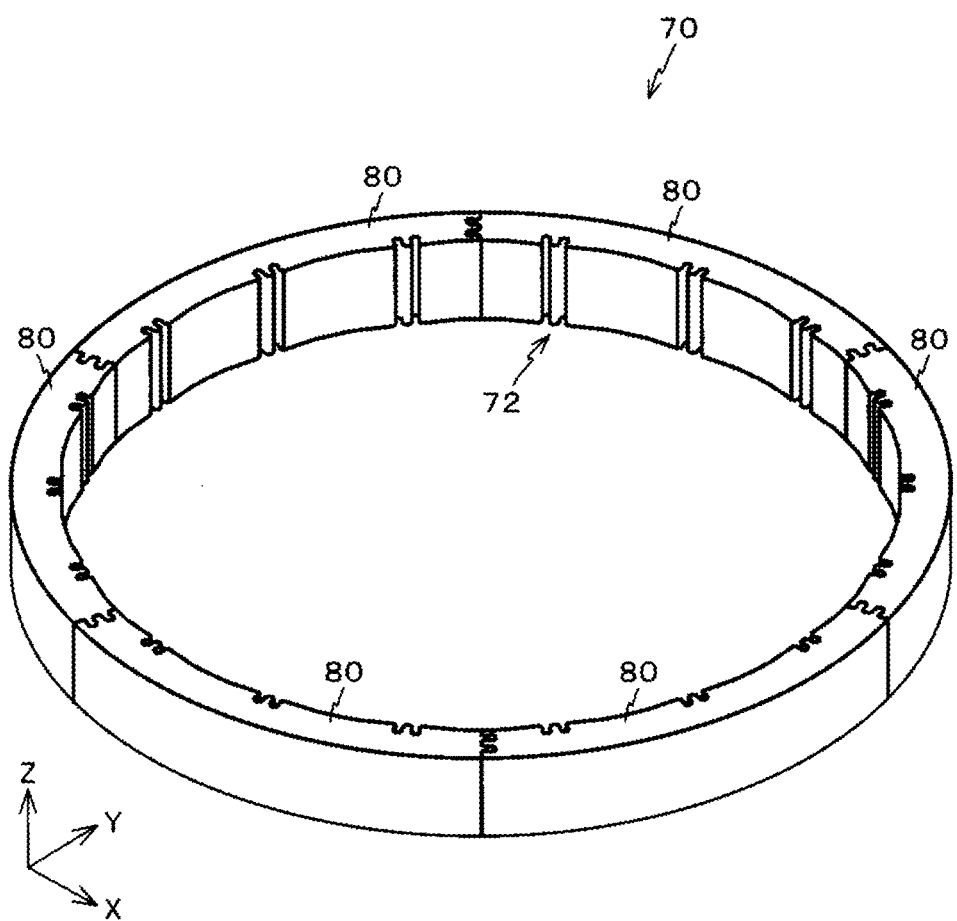
FIG. 16 is a perspective view of a first member according to a modified preferred embodiment.
Figure 17:
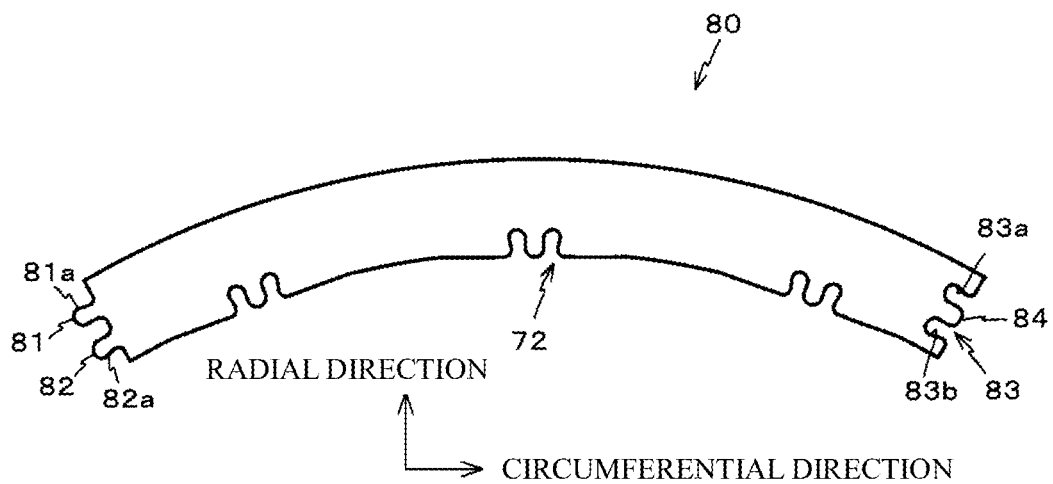
FIG. 17 is a plan view of a partitioning member.

In the above preferred embodiment, the case where the first member 70 is formed by overlapping the annular plates 710 shown in FIG. 7 has been described. The first member is not limited to the above, and as one example, the first member 70 may be comprised of a plurality of (for example, six (6)) dividing members 80 divided in the circumferential direction as shown in FIG. 16, FIG. 17 is a plan view of the dividing member 80. As shown in FIG. 17, the dividing member 80 is a fan-shaped member having a central angle of 60 degrees (=360/6). Like the second member 60 and the first member 70 according to the first preferred embodiment, the dividing member 80 is formed by stacking a plurality of plates made of electromagnetic steel plates. The dividing member 80 has the first concavity portion 72 into which the first protrusion 62 and the second protrusion 63 of the second member 60 are fitted. In addition, a pair of third protrusion 81 and fourth protrusion 82 protruding towards one circumferential-directional side are formed on one circumferential-directional end of the dividing member 80. On the other circumferential-directional end of the dividing member 80, furthermore, a second concavity portion 83 that is concaved towards one circumferential-directional side and a convexity portion 84 that protrudes towards the other circumferential-directional side are formed. A radial-directional distance between a contact face 81a of the third protrusion 81 and a contact face 82a of the fourth protrusion 82 is increased towards the one circumferential-directional side. Similarly, a distance between a third inner side face 83a and a fourth inner side face 83b of the second concavity portion 83 become narrow towards the other circumferential-directional side.

Figure 18:
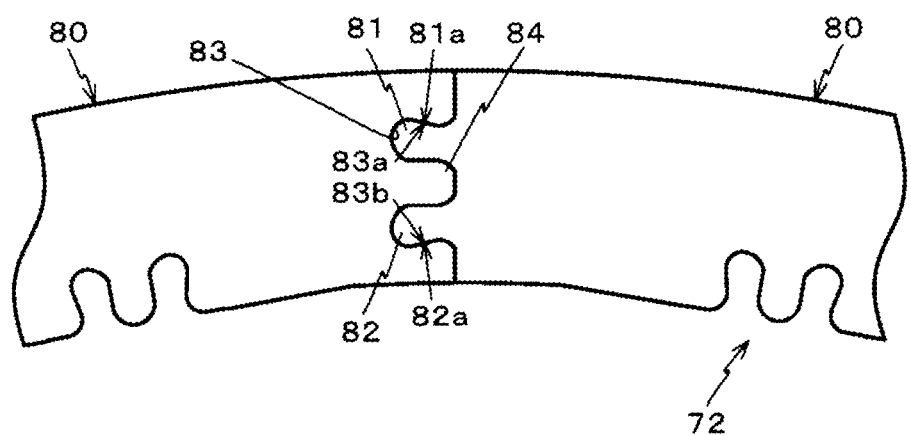
FIG. 18 is a diagram showing connecting portions of the partitioning members connected to each other.

The third protrusion 81 and the fourth protrusion 82 of the dividing member 80 have the same configuration as the first protrusion 62 and the second protrusion 63 of the second member 60, and perform the same function. Moreover, the second concavity portion 83 and the convexity portion 84 have the same configuration as the first concavity portion 72 and the convexity portion 73 of the first member 70, respectively, and perform the same function. FIG. 18 is an enlarged view showing connection portions of the dividing members 80 connected to each other. As shown in FIG. 18, the third protrusion 81 and the fourth protrusion 82 that are lightly press-fitted into the second concavity portion 83 are deformed so as to be approached to each other. In addition, the contact face 81a of the third protrusion 81 and the contact face 82a of the fourth protrusion 82 are pressed against the third inner side face 83a and the fourth inner side face 83b of the second concavity portion 83, respectively. In this state, an adhesive is filled between each of the third protrusion 81 and the fourth protrusion 82 and the inner wall face of the second concavity portion 83, and adheres the third protrusion 81 and the fourth protrusion 82, and an inner wall face of the second concavity portion 83. Due to the above, the dividing members 80 adjacent to each other are rigidly connected to each other. As shown in FIG. 16, the first member 70 is formed by connecting the six (6) dividing members 80 arranged in the circumferential direction to each other.

In the above-described preferred embodiment, the case where the motor 10 is an inner rotor motor provided with the stator 50 in which the second member 60 is disposed on a radial-directional inner side of the first member 70 has been described. The motor is not limited to the above, and the motor 10 may be an outer rotor motor provided with the stator 50 in which the second member 60 is disposed on a radial-directional outer side of the first member 70. Hereinafter, a motor 10A according to the second preferred embodiment is described. The same reference numerals are employed for the same or equivalent configuration as that in the first preferred embodiment, and the description thereof is omitted or simplified.

Figure 19:
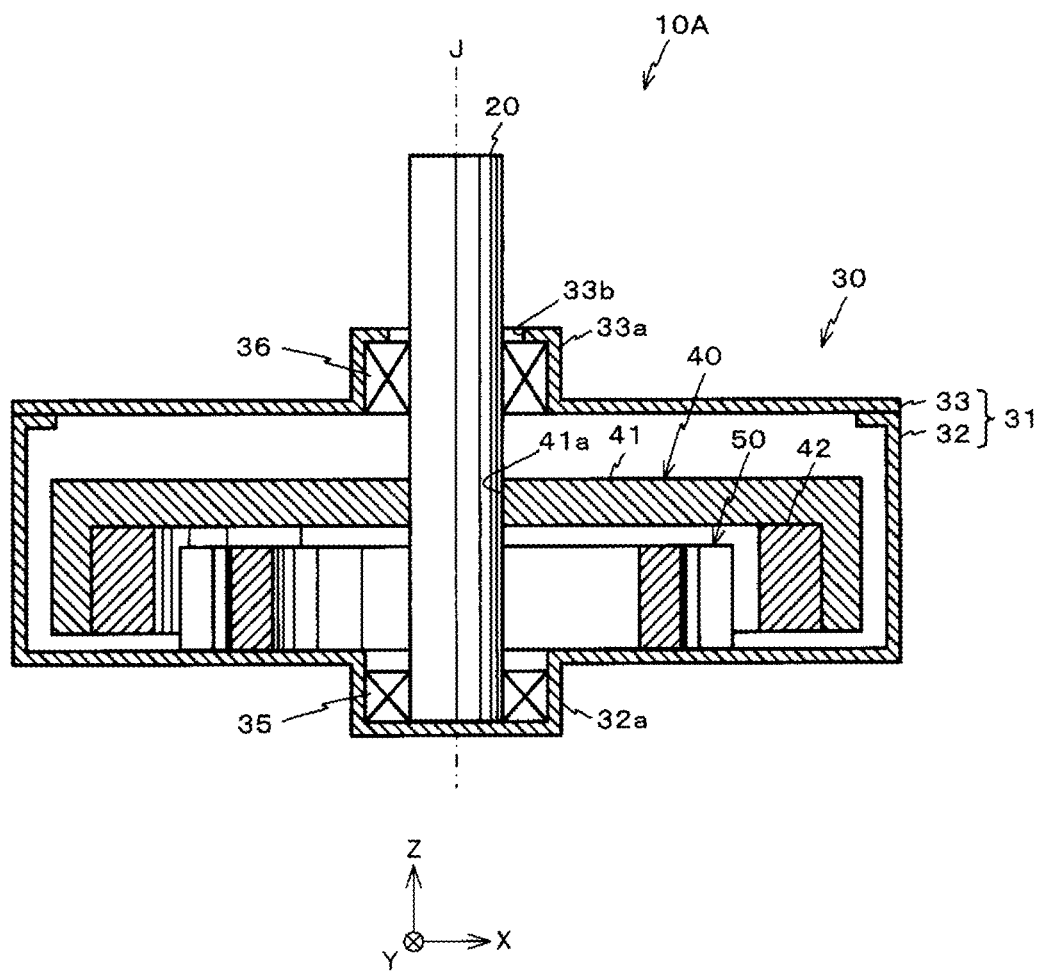
FIG. 19 is a diagram showing a X-Z cross section of a motor according to a second preferred embodiment.

FIG. 19 is a diagram showing a X-Z cross-section of the motor 10A according to the second preferred embodiment. The motor 10A differs from the motor 10 according to the first preferred embodiment in that the magnet 42 constituting the rotor 40 is disposed outside the stator 50.

Figure 20:
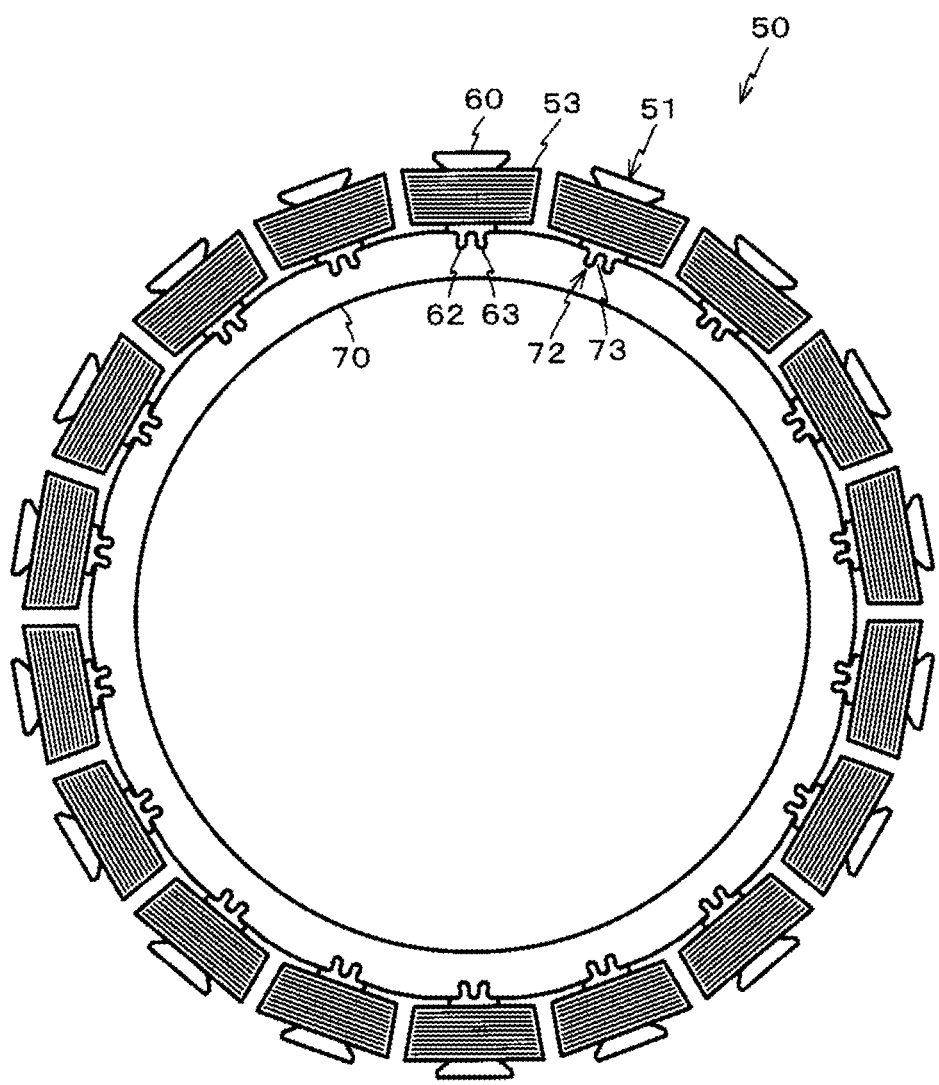
FIG. 20 is a plan view of a stator.

FIG. 20 is a plan view of the stator 50 constituting the motor 10A. As shown in FIG. 20, a stator core 51 of the stator 50 is comprised of a second member 60 and a first member 70. In the first member 70 according to the present preferred embodiment, the eighteen (18) first concavity portions 72 and the convexity portions 73 are formed on an outer circumferential surface of the first member 70 at regular intervals in the circumferential direction. In addition, the second member 60 to which the coil 53 is mounted is attached to a radial-directional outer side of the first member 70 by the pair of first protrusion 62 and second protrusion 63 are lightly press-fitted into the first concavity portion 72. Due to the above, the stator 50 is formed. As shown in FIG. 19, the stator 50 is disposed inside the case 32 so that the shaft 20 is located at a center. The magnet 42 constituting the rotor 40 is fixed to the base 41 and faces the stator 50 in the radial direction.

As described above, the motor according to the present disclosure may be an inner rotor motor. In this case, the second member 60 constituting the stator 50 is disposed on a radial-directional outer side of the first member 70.

In the above preferred embodiment, although the case where the stator 50 is provided with the eighteen (18) second members 60 has been described, the number of the second members 60 is not limited thereto.

In the above preferred embodiment, the case where the motor 10 is a PM motor has been described. The motor is not limited to the above, for example the motor 10 may be a motor such as an induction motor, a synchronous motor, or the like in which the rotor is comprised of the coil.

In the above preferred embodiment, as shown in FIG. 4, the case where the pair of first protrusion 62 and second protrusion 63 are formed on the second member 60 and the one first concavity portion 72 is formed on a corresponding position of the first member 70 has been described. The present disclosure is not limited to the above, the plurality of pairs of first protrusions 62 and second protrusions 63 may be formed on the second member 60, and the plurality of first concavity portions 72 may be formed in corresponding portions of the first member 70. Due to the above, it is possible to increase the stator 50 in size while maintaining the rigidity of the stator 50.

Similarly, in the above preferred embodiment, as shown in FIG. 17, the case where the pair of third protrusion 81 and fourth protrusion 82 are formed on one end of the dividing member 80 and the one second concavity portion 83 is formed in the other end of the dividing member 80 has been described. The present disclosure is not limited to the above, the plurality of pairs of third protrusions 81 and fourth protrusions 82 may be formed on one end of the dividing member 80, and the plurality of second concavity portions 83 may be formed in the other end of the dividing member 80. Due to the above, it is possible to increase the first member 70 in size while maintaining the rigidity of the first member 70.

In the above-described preferred embodiment, the case where the first member 70 is comprised of six (6) dividing members 80 has been described. However, the number of dividing members 80 constituting the first member 70 is not limited to the number mentioned above.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A stator configured to rotate a rotor about a central axis, comprising;
   a first member having a plurality of first concavity portions located in a circumferential direction at a preset interval, each of the first concavity portions having a pair of first inner side face and second inner side face whose a circumferential-directional distance therebetween with respect to the central axis becomes narrow from one radial-directional side towards the other radial-directional side with respect to the central axis, and
   a plurality of second members, each of the second members having a first protrusion extending along the first inner side face, a second protrusion extending along the second inner side face, and a teeth portion protruding from the first protrusion and the second protrusion to the other radial-direction side,
   wherein the plurality of second members correspond to the plurality of the first concavity portions, respectively, and
   wherein the first concavity portion comprises an inner wall face placed between the first inner side face and the second inner side face, a clearance is formed between a front end of one radial-directional side of the first and second protrusions and the inner side face.

2. The stator of claim 1, wherein the first protrusion or the second protrusion has a radial-directional length smaller than a radial-directional length of the first concavity portion.

3. The stator of claim 1, wherein the second member is disposed on a radial-directional inner side of the first member.

4. The stator of claim 1, wherein the second member is disposed on a radial-directional outer side of the first member.

5. The stator of claim 1, wherein an angle formed by a contact face of the first protrusion which is in contact with the first inner side face and a contact face of the second protrusion which is in contact with the second inner side face is greater than an angle formed by the first inner side face and the second inner side face.

6. The stator of claim 1, wherein the second member further comprises a dent portion, which is concaved towards the other radial-directional side, between the first protrusion and the second protrusion.

7. The stator of claim 1, wherein the first member has a convexity portion, which is placed between the first protrusion and the second protrusion.

8. The stator of claim 1, wherein a shim member is disposed between the first protrusion and the second protrusion.

9. The stator of claim 8, wherein the shim member is made of a metal.

10. The stator of claim 6, wherein the dent portion is filled with a filler.

11. The stator of claim 10, wherein the filler has Young's modulus of 100 Mpa or more after curing.

12. The stator of claim 10, wherein the filler comprises a low-melting-point-alloy.

13. The stator of claim 10, wherein the filler is a mixture of resin and a powdered metal material.

14. The stator of claim 10, wherein the filler is a mixture of resin and a powdered inorganic material.

15. The stator of claim 10, wherein the filler is a low-melting-point alloy.

16. The stator of claim 10, wherein the filler is made of an inorganic material having the property by which it is solidified from a liquefied state.

17. The stator of claim 1, wherein the first member and the second member are comprised of a plurality of electromagnetic steel plate stacked in the central axial direction.

18. The stator of claim 1, wherein the first member is comprised of a plurality of dividing members disposed around of the central axis and connected to each other, each dividing member has a second concavity portion formed on one circumferential-directional end side thereof, the second concavity portion comprises a pair of third inner side face and fourth inner side face whose a circumferential-directional distance therebetween becomes narrow from the other radial-directional end toward one radial-directional end, each dividing member has a third protrusion extending the third inner side face and a fourth protrusion extending the fourth inner side face, which are formed at the other circumferential-directional end side, and the third protrusion and the fourth protrusion are fitted into the second concavity portion of the dividing member which is adjacent thereto.

19. A motor comprising;
   a shaft supported rotatably about a central axis;
   a rotor secured to the shaft; and
   a stator according to claim 1 configured to rotate the rotor about the central axis by an electromagnetic action with the rotor.

20. A stator configured to rotate a rotor about a central axis, comprising;
   a first member having a plurality of first concavity portions located in a circumferential direction at a preset interval, each of the first concavity portions having a pair of first inner side face and second inner side face whose a circumferential-directional distance therebetween with respect to the central axis becomes narrow from one radial-directional side towards the other radial-directional side with respect to the central axis, and
   a plurality of second members, each of the second members having a first protrusion extending along the first inner side face, a second protrusion extending along the second inner side face, and a teeth portion protruding from the first protrusion and the second protrusion to the other radial-direction side,
wherein the plurality of second members correspond to the plurality of the first concavity portions, respectively, and
wherein the first member and the second member are comprised of a plurality of electromagnetic steel plate stacked in the central axial direction.

* * * * *